(12) United States Patent
Chen

(10) Patent No.: US 7,097,215 B2
(45) Date of Patent: Aug. 29, 2006

(54) DEVICE FOR LATCHING AND RELEASING THE LID OF A PORTABLE COMPACT DISK PLAYER

(75) Inventor: Tzu-Nan Chen, Taipei (TW)

(73) Assignee: Liteon It Corp., (TW)

( * ) Notice: Subject to any disclaimer, the term of this patent is extended or adjusted under 35 U.S.C. 154(b) by 462 days.

(21) Appl. No.: 10/385,282

(22) Filed: Mar. 10, 2003

(65) Prior Publication Data

US 2004/0052195 A1   Mar. 18, 2004

(51) Int. Cl.
*E05C 3/06* (2006.01)

(52) U.S. Cl. .............................. 292/201; 292/DIG. 72; 361/75.11; 720/600

(58) Field of Classification Search ................ 292/201, 292/DIG. 11, DIG. 72; 361/75.11; 720/600
See application file for complete search history.

(56) References Cited

U.S. PATENT DOCUMENTS 5,150,933 A * 9/1992 Myslicki et al. ............ 292/216
6,501,646 B1 * 12/2002 Suzuki ........................ 361/686
6,925,647 B1 * 8/2005 Kabasawa .................... 720/601
2003/0102678 A1 * 6/2003 Huang ......................... 292/102

* cited by examiner

Primary Examiner—Gary Estremsky
(74) Attorney, Agent, or Firm—Raymond Sun (57) ABSTRACT

An optical disk reading device has a lid having a catch hole provided along an edge, and a locking element having a catch part that removably engages the catch hole, and a push rod directing part. The locking element is pivotable to cause the catch part to engage and disengage the catch hole to close and open the lid, respectively. The optical disk reading device further includes a push rod having a tab provided at the bottom end, the push rod assuming an unlocked position when the catch part disengages the catch hole, and assuming a locked position when the catch part engages the catch hole. The optical disk reading device further includes a guide track having a stop edge, with the tab traveling along the guide track and secured at the stop edge when the push rod is in the locked position. The push rod directing part contacts the tab to cause the tab to be disengaged from the stop edge when the locking element is pivoted to disengage the catch part from the catch hole.

13 Claims, 7 Drawing Sheets

DEVICE FOR LATCHING AND RELEASING THE LID OF A PORTABLE COMPACT DISK PLAYER

BACKGROUND OF THE INVENTION

1. Field of the Invention

The present invention relates to an optical disk reading device, and in particular, to a device for latching and forcibly releasing the lid of a portable compact disk player.

2. Description of the Prior Art

The latching and release device for the lids of conventional portable compact disk players is generally designed to have a release spring that pushes against the lid when it is in a latched position. When the lid is about to be popped open, the normal bias (which acts as a restoring force) of the compressed release spring can be used to overcome the holding force of the compact disk holding device, and together with the torque applied at the pivot axle, causes the lid to be released. However, the normal bias of the release spring constantly acts on the lid when the lid is in the latched position. In addition, in order to overcome the holding force of the holding device when the lid is released, the force of the normal bias must be, in general, quite large. If the lid is made of a plastic material, when the compact disk player is stored or used in a high-temperature environment, the lid may be subjected to heat such that the rigidity of the material is reduced. As a result, the force of the normal bias of the release spring can easily cause the lid to deform, which will affect the overall appearance of the compact disk player and may cause abnormal playback, among other disadvantages.

Figure 1:
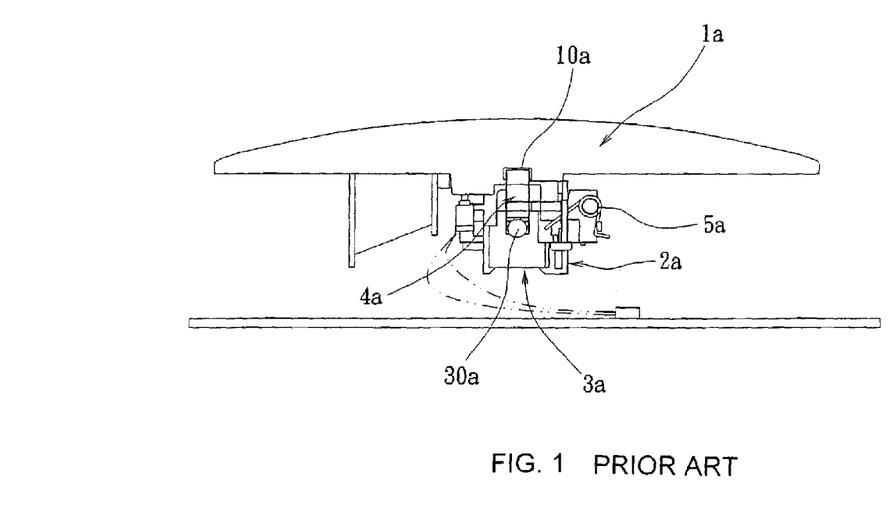
FIG. 1 is a cross-sectional view illustrating a conventional portable compact disk player.

FIG. 1 illustrates a conventional compact disk player system, which comprises at least a lid seat (not shown in the figure), a lid $1a$, a solenoid base $2a$, a solenoid $3a$, a catch $4a$ and a torsion spring $5a$ (which functions as the release spring), among other components. When the lid $1a$ covers the lid seat, the catch at the upper end of the catch $4a$ hooks into the latching hole $10a$ at the front edge of the lid $1a$, while at the same time, the end of the torsion spring $5a$ pushes against the contact part at the front edge of the lid $1a$ to provide a normal bias that acts as a restoring force. When the lid $1a$ is to be opened up from its seat, an extension plunger $30a$ at the front end of the solenoid $3a$ retracts when the coil is energized. This causes the catch part of the catch $4a$ to rotate and withdraw from the latching hole $10a$, which allows the normal bias (restoring force) of the torsion spring $5a$ to pop the lid $1a$ open.

Figure 2:
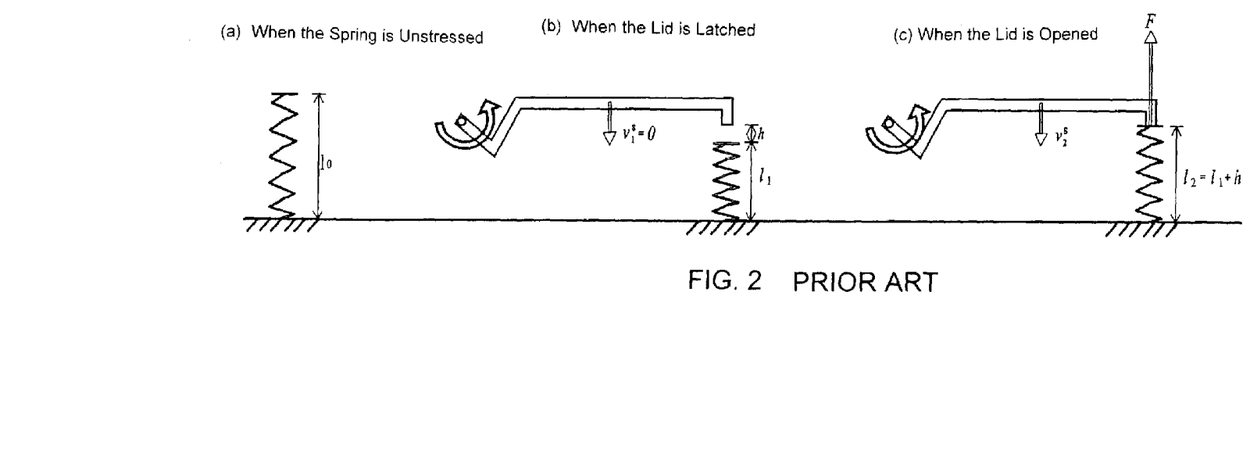
FIGS. 2(a), 2(b) and 2(c) illustrate some basic concepts for the present invention.
Figure 3:
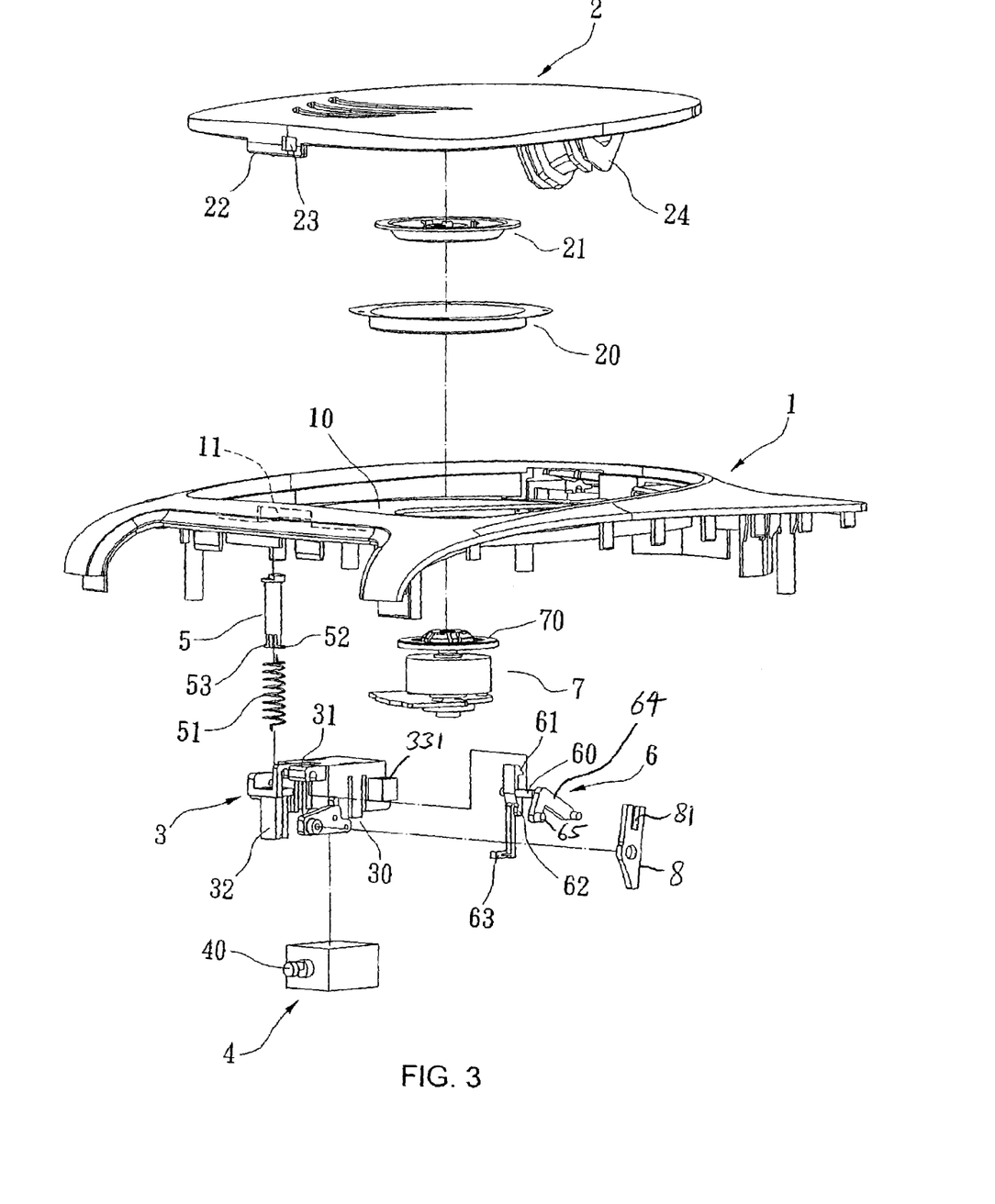
FIG. 3 is an exploded perspective view of a portable compact disk player according to one embodiment of the present invention.

In addition, as shown in FIG. 2($a$), when the release spring is in an unstressed state (i.e., when no external force is applied), the free length of the release spring is $l_0$. However, when the lid is in a latched state as shown in FIG. 2($b$), the release spring is subjected to a predetermined compression force such that the length of the spring is $l_1$ and the velocity of the lid is $v_1^s=0$, while a gap h remains between the lid and the spring. In the instant when the lid is about to be popped open as shown in FIG. 3($c$), the lid has an initial velocity $v_2^s$, and $l_2=l_1+h$, and in this manner, an applied force is generated:

F=impact force+restoring force, with the formula calculated as follows, where the mass of the spring is m and the spring constant is k:

(a) when the lid is in a latched state,
Kinetic energy $T_1=(1/2)*m_s(v_1^s)^2=0$
Potential energy $V_1=(1/2)*k(l_0-l_1)^2$ (b) In the instant when the lid is about to be popped open
Kinetic energy $T_2=(1/2)*m_s(v_2^s)^2$
Potential energy $V_2=(1/2)*k(l_0-l_1)^2$ (c) Using the law of conservation of energy
$T_1+V_1=T_2*V_2$ $$v_2^s = \sqrt{\frac{k(2l_0 - 2l_1 + h)h}{m_3}}$$

(4) Applied force F=impact force+restoring force $$= m_s \frac{\Delta v}{\Delta t} + k(l_0 - l_2)$$

$$= m_s \frac{v_2^s}{\Delta t} + k(l_0 - l_2)$$

Thus, there remains a need for a device for latching and forcibly releasing the lid of a portable compact disk player which overcomes the drawbacks described above.

SUMMARY OF THE DISCLOSURE

It is an object of the present invention to provide a latching and release device for the lid of a portable compact disk player which provides a gap between the release spring and the lid when the lid is latched so that the release spring does not exert a continuous restoring force against the closed lid.

It is another object of the invention to provide a latching and release device for the lid of a portable compact disk player which creates a reaction distance using the gap between the release spring and the lid, so as to generate a spring impact force which, in combination with the restoring force generated by the compression of the release spring, provides a greater release force to pop open the lid.

In order to accomplish the objects of the present invention, the present invention provides an optical disk reading device having a lid having a catch hole provided along an edge, and a locking element having a catch part that removably engages the catch hole, and a push rod directing part. The locking element is pivotable to cause the catch part to engage and disengage the catch hole to close and open the lid, respectively. The optical disk reading device further includes a push rod having a tab provided at the bottom end, the push rod assuming an unlocked position when the catch part disengages the catch hole, and assuming a locked position when the catch part engages the catch hole. The optical disk reading device further includes a guide track having a stop edge, with the tab traveling along the guide track and secured at the stop edge when the push rod is in the locked position. The push rod directing part contacts the tab to cause the tab to be disengaged from the stop edge when the locking element is pivoted to disengage the catch part from the catch hole. A resilient element is operatively coupled to the push rod to normally bias the push rod to the unlocked position. Thus, by securing the push rod at the step edge when the lid is closed, the top of the push rod is spaced apart from the lid so that the lid is free from any force from the push rod.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with a portable compact disk player, the present invention can be applied to all optical disk reading devices, including but not limited to compact disk (CD) player systems, DVD drives, CD/DVD drives, DVD/RW combo drives, car audio drives, etc.

In order to achieve the above objectives, the present invention provides a device for the latching and release of the lid of a portable compact disk player where there is no continuous restoring force applied against the closed lid.

Referring to FIG. 3, the latching and release device for the lid of a portable compact disk player of the present invention includes an upper cover 1, a lid 2, a solenoid housing 3, a solenoid 4, a push rod 5 and a movable locking element 6, among other components.

The upper cover 1 has a holding surface 10 that is used to define a holding space for a compact disk. The holding surface is provided with a notch 11 of a suitable size at its front end. The upper cover 1 is also provided with a plurality of attachment parts on its bottom side for use in an integrated assembly with a lower cover (not shown in the drawings). A main axial motor 7 is covered and mounted within the upper cover 1 and the lower cover. A spin tray 70 for the compact disk is provided on top of the main axial motor 7 and extends into the interior space of the holding space, so that the spin tray 70 can carry the compact disk such that the compact disk can be suspended above the holding space.

The middle part of the lid 2 is provided with a holding device base 20 and a holding device 21 that is located in the holding device base 20 and that can project out of the holding device base 20. The holding device 21 applies a strong magnetic force to attract the spin tray 70 so that the compact disk can be securely fixed between the holding device 21 and the spin tray 70. The front end of the lid 2 extends downward to form a latching part 22, with a latching hole 23 provided in the latching part 22. The lid 2 is also provided with a pivoting hinge part 24 at its rear end, with the pivoting hinge part 24 pivotably connected at a preset location to the rear end of the upper cover 1. The lid 2 pivots about the pivoting hinge part 24 to open and close the lid 2 onto the upper cover 1.

Figure 4:
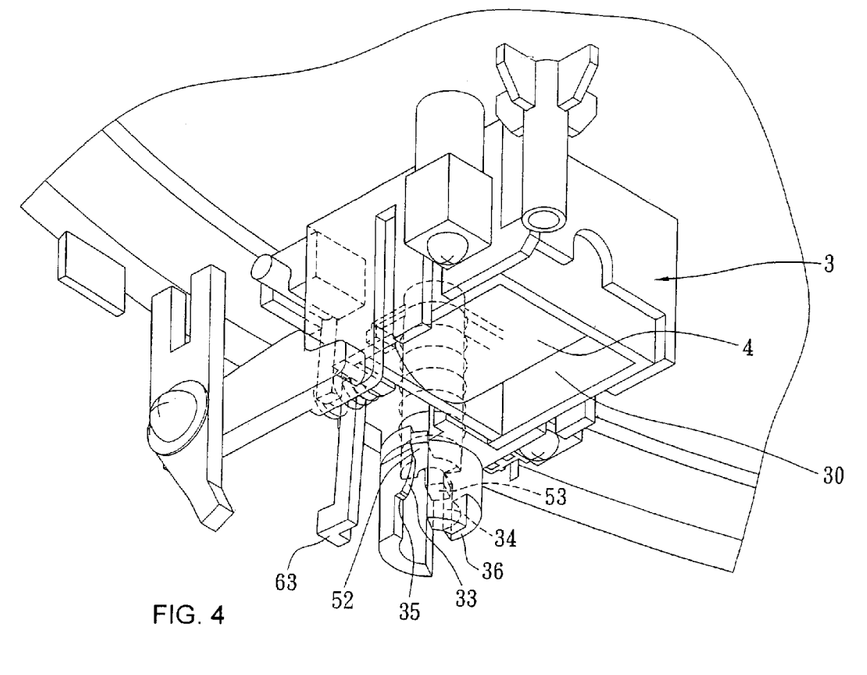
FIGS. 4 and 5 are partial bottom perspective views of the disk player of FIG. 3 shown with the lid opened.
Figure 5:
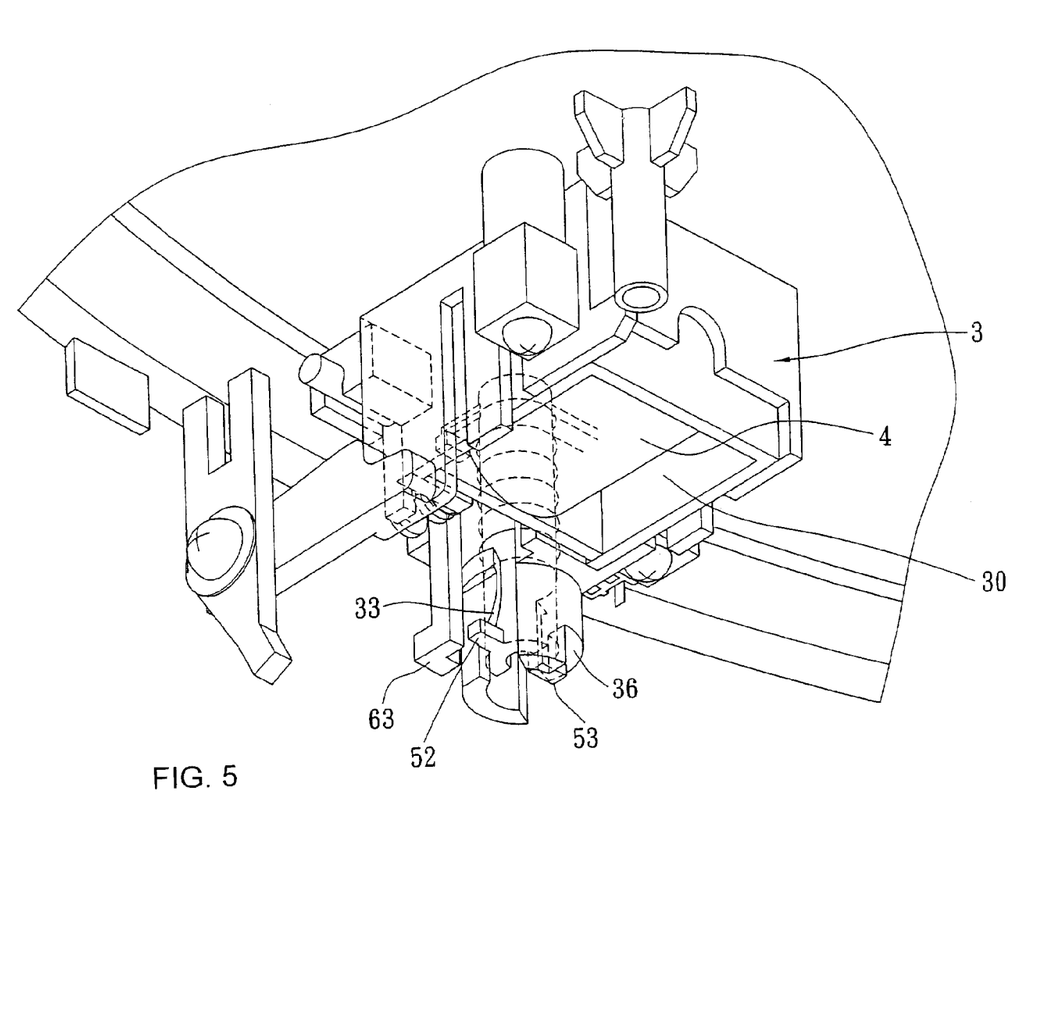
Figure 6:
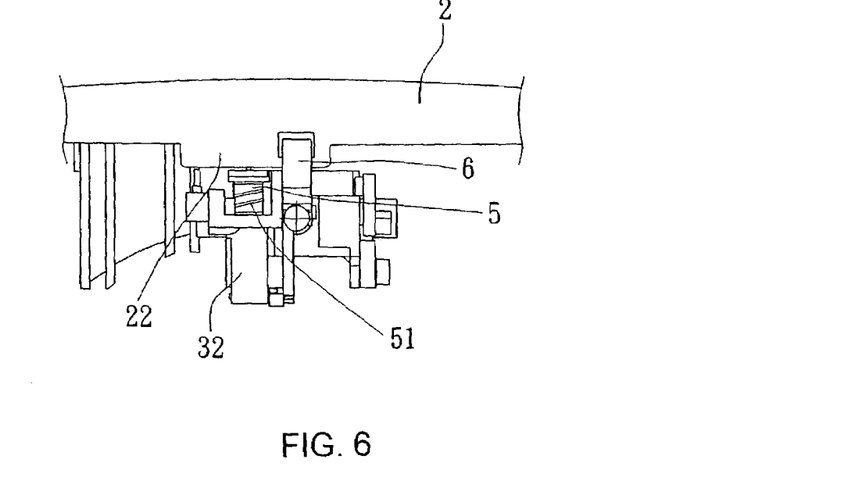
FIG. 6 is a front view of the state of the lid of FIG. 3 when it is about to be closed.
Figure 7:
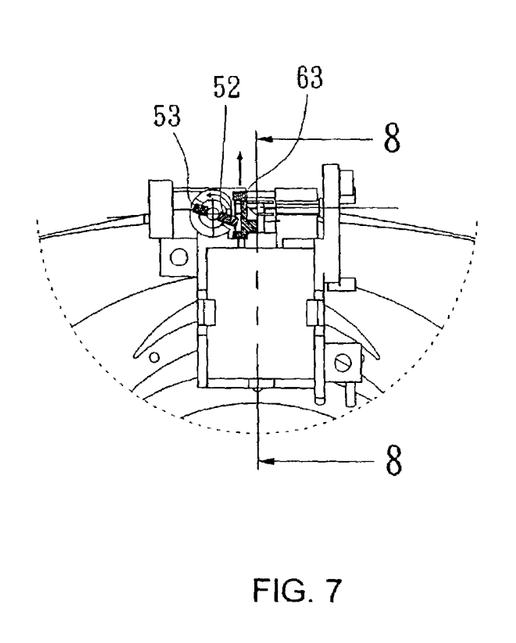
FIG. 7 is a top view of the state of the lid of FIG. 3 when it is about to be closed.
Figure 8:
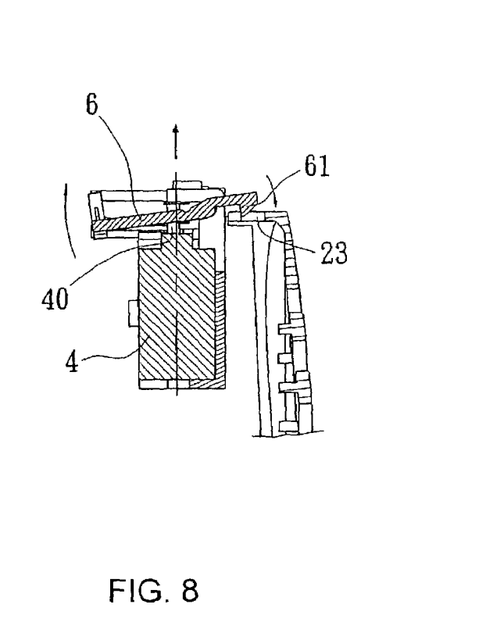
FIG. 8 is a sectional view taken along line 8—8 of FIG. 7.
Figure 9:
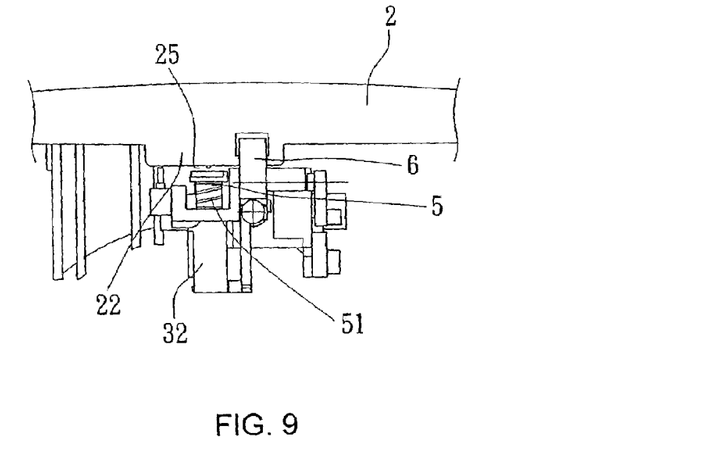
FIG. 9 is a front view of the state of the lid of FIG. 3 when it is locked.
Figure 10:
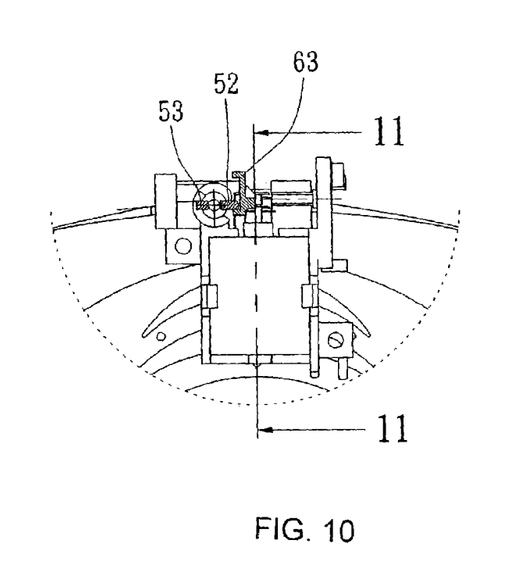
FIG. 10 is a top view of the state of the lid of FIG. 3 when it is locked.
Figure 11:
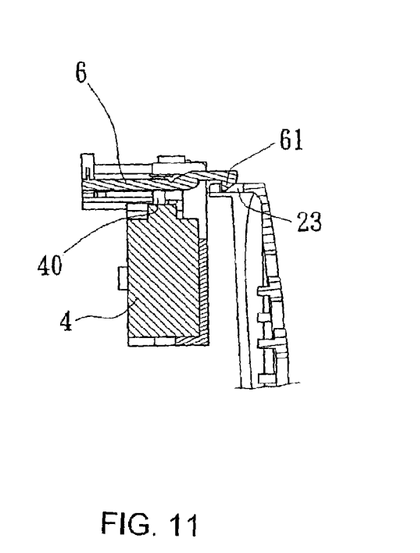
FIG. 11 is a sectional view taken along line 11—11 of FIG. 10.

The solenoid housing 3 is secured to the bottom side of the upper cover 1 by a plurality of threaded screws that extend through a connecting portion 331 in the solenoid housing 3 which is adjacent to the above-mentioned notch 11. The solenoid housing 3 is provided with a holding cavity 30, a pivot part receiver 31, and a vertical guide tube 32 that is aligned with the notch 11 on one end. Referring also to FIGS. 4 and 5, the guide tube 32 is provided with an inclined guide track 33 along its side edge as well as a vertical guide track 34 located on the side opposite to the inclined guide track 33. The inclined guide track 33 defines a stop edge 35 at a bottom end while the vertical guide track 34 defines a capture point 36 at its bottom end. The vertical elevation of the capture point 36 is approximately the same as the vertical elevation of the stop edge 35 (i.e., 35 and 36 are at approximately the same level). In addition, the solenoid 4 is installed inside the holding cavity 30 of the solenoid housing 3. The solenoid 4 has an extension plunger 40 that projects outwardly, and the extension plunger 40 can be suitably excited to extend forward or retract backwards.

The push rod 5 is inserted into the interior bore defined by a matching compression spring 51. One end of the spring 51 pushes against the bottom edge of the top surface of the push rod 5, while the other end of the spring 51 pushes against the top surface of the guide tube 32, so that the push rod 5 can be moved inside the guide tube 32 in a spring-like manner, and to be appropriately projected out above the notch 11. The lower end of the push rod 5 is provided with a first positioning tab 52, and a second positioning tab 53 that is located on the side opposite to the first positioning tab 52. The first positioning tab 52 can be positioned at the stop edge 35 along the inclined guide track 33, while at the same time, the second positioning tab 53 can be positioned at the capture point 36 along the vertical guide track 34.

The locking element 6 is provided with a pivot part 60, a hook-shaped catch part 61 extending from a first end of the pivot part 60, an L-shaped holding part 62 extending from the first end of the pivot part 60 in a direction opposite to that of the catch part 61, a push rod directing part 63 extending parallel to the holding part 62, and an eject bar 64 provided at a second end of the pivot part 60. As best shown in FIG. 3, the pivot part 60 is pivotably connected inside a curved channel of the pivot part receiver 31 of the solenoid housing 3, and the catch part 61 can be appropriately hooked into the latching hole 23 of the lid 2. The holding part 62 is held by the extension plunger 40 of the solenoid 4, and extension plunger 40 can be appropriately moved forward and backward so that the locking element 6 can pivot in a corresponding manner with the pivot part 60 as the pivoting center of rotation. The rod directing part 63 can be used to appropriately direct the first positioning tab 52 that is positioned at the stop edge 35.

Next, reference is made to FIGS. 6–8, 9–11 and 12–14, which respectively illustrate the state of the lid 2 when the lid 2 is to be closed, the state of the lid 2 when the lid 2 is locked, and the state of the lid 2 when the lid 2 is popped open.

Referring to FIGS. 4 and 6–8, when the lid 2 is to be closed, the bottom edge of latching part 22 of the lid 2 moves downward and presses against the top surface of the push rod 5, while at the same time the catch part 61 of the locking element 6 moves upward along the wall below the latching hole 23, and the first positioning tab 52 of the push rod 5 moves downward along the inclined guide track 33, such that the spring 51 is tensioned. In addition, when the bottom edge of the latching part 22 of the lid 2 pushes downward to a certain point, the catch part 61 of the locking element 6 will instantly hook into the latching hole 23 of the latching part 22, but at this time there is still a short distance between the first positioning tab 52 of the push rod 5 and the stop edge 35. For this reason, the push rod 5, under the action of the predetermined torque force provided by the spring 51, will force the first positioning tab 52 to rotate and move downward to travel along the above-mentioned short distance along the inclined guide track 33 to the stop edge 35. Thus, in this manner, the top surface of the push rod 5 can be prevented from coming into contact with the lid 2.

As shown in FIGS. 5 and 9–11, when the lid 2 is in a latched state, the first positioning tab 52 is positioned at the stop edge 35 while at the same time the second positioning tab 53 is positioned at the capture point 36, so that there is a small distance (i.e., gap 25) between the push rod 5 (or spring 51) and the lid 2. In other words, the spring restoring force of the spring 51 does not act upon the lid 2. As a result, deformation of the lid 2 caused by an excessive spring restoring force can be prevented. In addition, the magnetic connection force between the holding device 21 and disk spin tray 70 maintains the lid 2 in a closed position.

Figure 12:
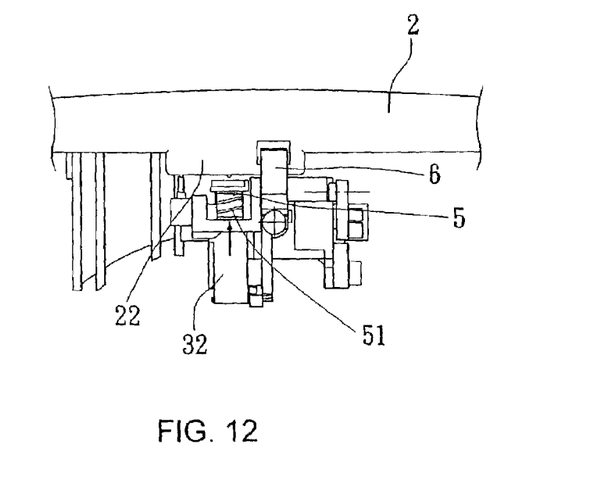
FIG. 12 is a front view of the state of the lid of FIG. 3 when it is about to be opened.
Figure 13:
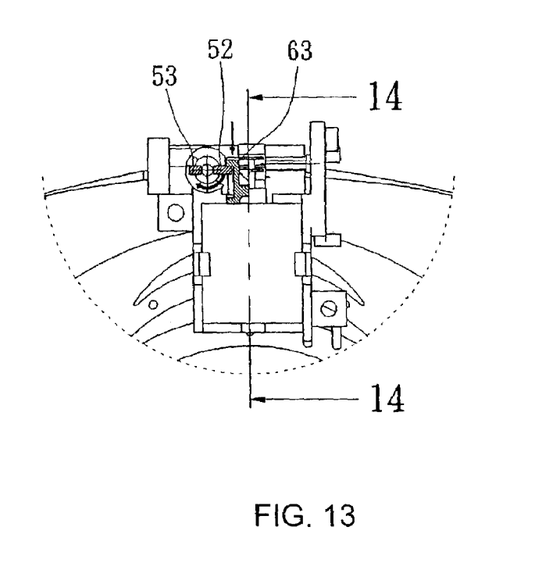
FIG. 13 is a top view of the state of the lid of FIG. 3 when it is about to be opened.
Figure 14:
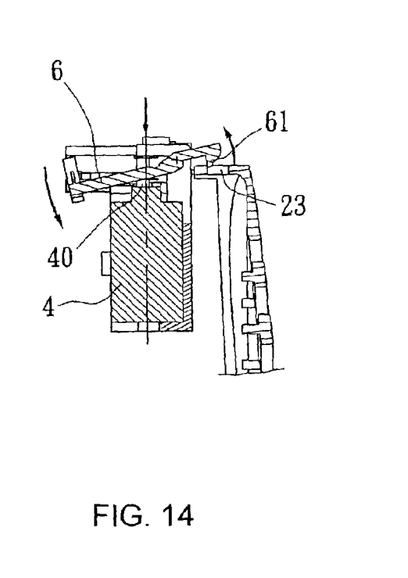
FIG. 14 is a sectional view taken along line 14—14 of FIG. 13.

Referring now to FIGS. 12–14, when the lid 2 is to be popped open, the solenoid 4 is energized to cause its extension plunger 40 to retract backwards, so that the catch part 61 of the locking element 6 is moved outward to disengage from the latching hole 23. At the same time, the rod directing part 63 of the locking element 6 is directed against the first positioning tab 52 that is positioned at the stop edge 35 (see FIG. 5) to cause the first positioning tab 52 and the second positioning tab 53 to rotate simultaneously so as to disengage from the stop edge 35 and the capture point 36, respectively, of the guide track tube 32. The restoring force (i.e., the normal bias) of the spring 51 will cause the push rod 5 to move upwardly to push the lid 2 to detach from the magnetic connection force between the holding device 21 and disk spin tray 70, thereby opening the lid 2. As the push rod 5 moves up, the first positioning tab 52 and the second positioning tab 53 will travel upwardly along the guide tracks 33 and 33, respectively, as shown in FIG. 4.

The present invention further provides an emergency eject mechanism 8 which is rotatably coupled to the solenoid housing 3. The emergency eject mechanism 8 has a channel 81 that receives a projection 65 on the eject bar 64. If the solenoid 4 is not working, the user can manually tilt the eject mechanism 8 in a clockwise direction (as viewed from the orientation of FIG. 3) to cause the locking element 6 to rotate, which in turn causes the rod directing part 63 to be directed against the first positioning tab 52 in the manner described above to open the lid 2.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An optical disk reading device, comprising:
   a lid having an edge and a catch hole provided along the edge;
   a locking element having a catch part that removably engages the catch hole, and a push rod directing part, the locking element pivotable to cause the catch part to engage and disengage the catch hole;
   a push rod having a top end and a bottom end, the push rod having a tab provided at the bottom end, the push rod assuming an unlocked position when the catch part disengages the catch hole, and assuming a locked position when the catch part engages the catch hole;
   a guide track having a stop edge, with the tab traveling along the guide track and secured at the stop edge when the push rod is in the locked position, and with the push rod directing part contacting the tab to cause the tab to be disengaged from the stop edge when the locking element is pivoted to disengage the catch part from the catch hole; and
   a resilient element operatively coupled to the push rod to normally bias the push rod to the unlocked position.

2. The device of claim 1, further including a solenoid operatively coupled to the locking element to cause the locking element to pivot.

3. The device of claim 1, wherein the tab is a first tab, wherein the bottom end of the push rod further includes a second tab, and wherein the guide track further includes a capture point, with the second tab traveling along the guide track and secured at the capture point when the push rod is in the locked position.

4. The device of claim 3, wherein the guide track is a tube having a bottom end, an inclined track along which the first tab travels, and a vertical track along which the second tab travels, with the resilient element and the push rod partially retained inside the tube.

5. The device of claim 3, wherein the first and second tabs are positioned at the same elevation.

6. The device of claim 4, further including:
   a solenoid operatively coupled to the locking element to cause the locking element to pivot;
   a solenoid housing that houses the solenoid, and to which the tube is connected.

7. The device of claim 1, wherein the top end of the push rod is spaced apart from the lid when the push rod is in the locked position.

8. The device of claim 1, wherein the lid is free from any force from the push rod when the push rod is in the locked position.

9. An optical disk reading device, comprising:
   a lid having a catch hole;
   a locking element having a catch part that removably engages the catch hole;
   a guide track having a stop edge;
   a push rod having a tab that travels along the guide track, the push rod assuming an unlocked position when the catch part disengages the catch hole, and assuming a locked position when the catch part engages the catch hole, with the tab secured at the stop edge when the push rod is in the locked position; and
   a resilient element operatively coupled to the push rod to normally bias the push rod to the unlocked position.

10. The device of claim 9, further including means for moving the push rod from the locked position to the unlocked position.

11. The device of claim 10, wherein the moving means is coupled to the locking element so that pivoting of the locking element will cause the moving means to move the push rod from the locked position to the unlocked position.

12. The device of claim 10, further including means for pivoting the locking element.

13. The device of claim 9, wherein the locking element includes a push rod directing part, with the push rod directing part contacting the tab to cause the tab to be disengaged from the stop edge when the locking element is moved to disengage the catch part from the catch hole.

* * * * *